United States Patent
Baylis et al.

(10) Patent No.: US 9,189,928 B2
(45) Date of Patent: Nov. 17, 2015

(54) TABLET BASED KIOSK

(71) Applicants: Stephen Todd Baylis, Lakeland, FL (US); Peter Rudden, Lakeland, FL (US); Brian Herrera, Lakeland, FL (US); Tyler Stagner, Lakeland, FL (US)

(72) Inventors: Stephen Todd Baylis, Lakeland, FL (US); Peter Rudden, Lakeland, FL (US); Brian Herrera, Lakeland, FL (US); Tyler Stagner, Lakeland, FL (US)

(*) Notice: Subject to any disclaimer, the term of this patent is extended or adjusted under 35 U.S.C. 154(b) by 126 days.

(21) Appl. No.: 13/998,261

(22) Filed: Oct. 16, 2013

(65) Prior Publication Data

US 2015/0102103 A1    Apr. 16, 2015

(51) Int. Cl.
  *G07G 1/00* (2006.01)
  *G06F 1/16* (2006.01)
  *G06K 7/01* (2006.01)
  *G07F 7/08* (2006.01)

(52) U.S. Cl.
  CPC ............ *G07G 1/0018* (2013.01); *G06F 1/1696* (2013.01); *G06K 7/01* (2013.01); *G07F 7/088* (2013.01)

(58) Field of Classification Search
  CPC .................................................. G07G 1/0018
  USPC ........................................................ 235/439
  See application file for complete search history.

(56) References Cited

U.S. PATENT DOCUMENTS

| | | | |
|---|---|---|---|
| 8,542,495 B1* | 9/2013 | Gorman et al. | 361/752 |
| 8,727,290 B1* | 5/2014 | De La Matta et al. | 248/160 |
| 2006/0092094 A1* | 5/2006 | Kennedy et al. | 345/1.1 |
| 2010/0057620 A1* | 3/2010 | Li et al. | 705/71 |
| 2012/0267491 A1* | 10/2012 | Chiu | 248/221.11 |
| 2013/0050973 A1* | 2/2013 | Rohrbach | 361/807 |
| 2013/0282501 A1* | 10/2013 | Edwards et al. | 705/17 |
| 2014/0191033 A1* | 7/2014 | Wojcik et al. | 235/449 |
| 2014/0279116 A1* | 9/2014 | Vasquez et al. | 705/21 |

\* cited by examiner

*Primary Examiner* — Thien T Mai
*Assistant Examiner* — Toan Ly

(57) ABSTRACT

A tablet based kiosk to securely support a tablet such as a personal computer to receive, transmit and display information or data comprising a tablet mount including a frame having a back frame member and a front frame member coupled together to retain or house the tablet therein and a card swipe scanner housing to operatively retain a card scanner or swipe to scan information from a card to transmit information from the tablet and card scanner such as payments to a remote site, and supported above the floor or other surface by a stand including a substantially vertical column coupled to the frame by an upper coupling assembly including a power supply housing and coupled to a base by a lower coupling assembly, and a lock mechanism to selectively lock the tablet and tablet mount to the stand.

12 Claims, 11 Drawing Sheets

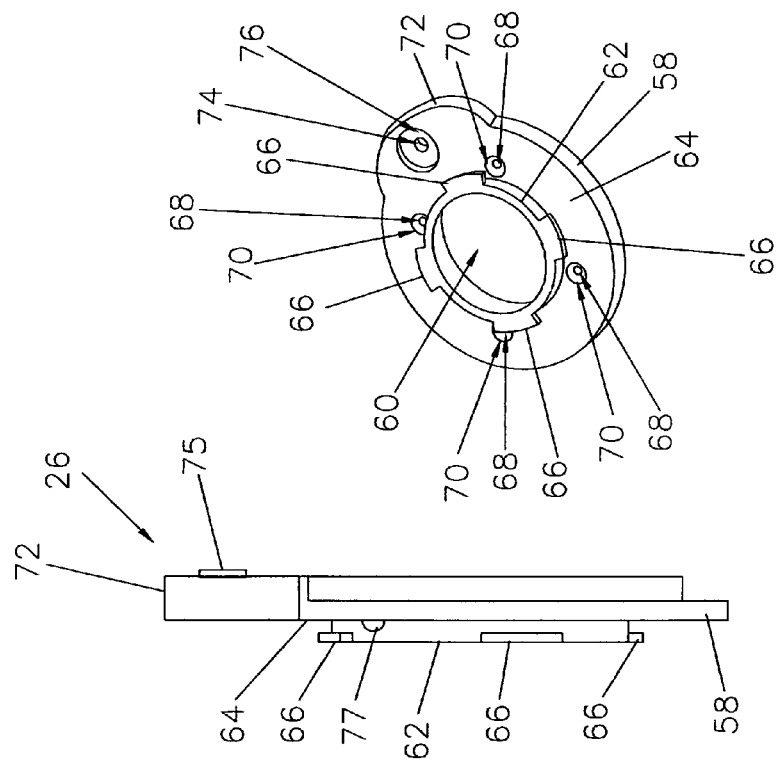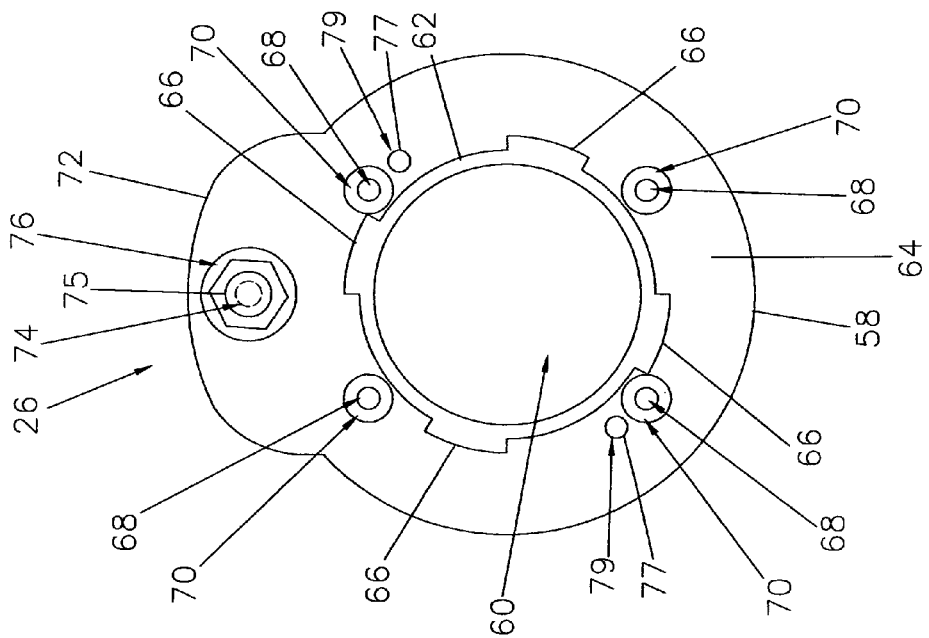

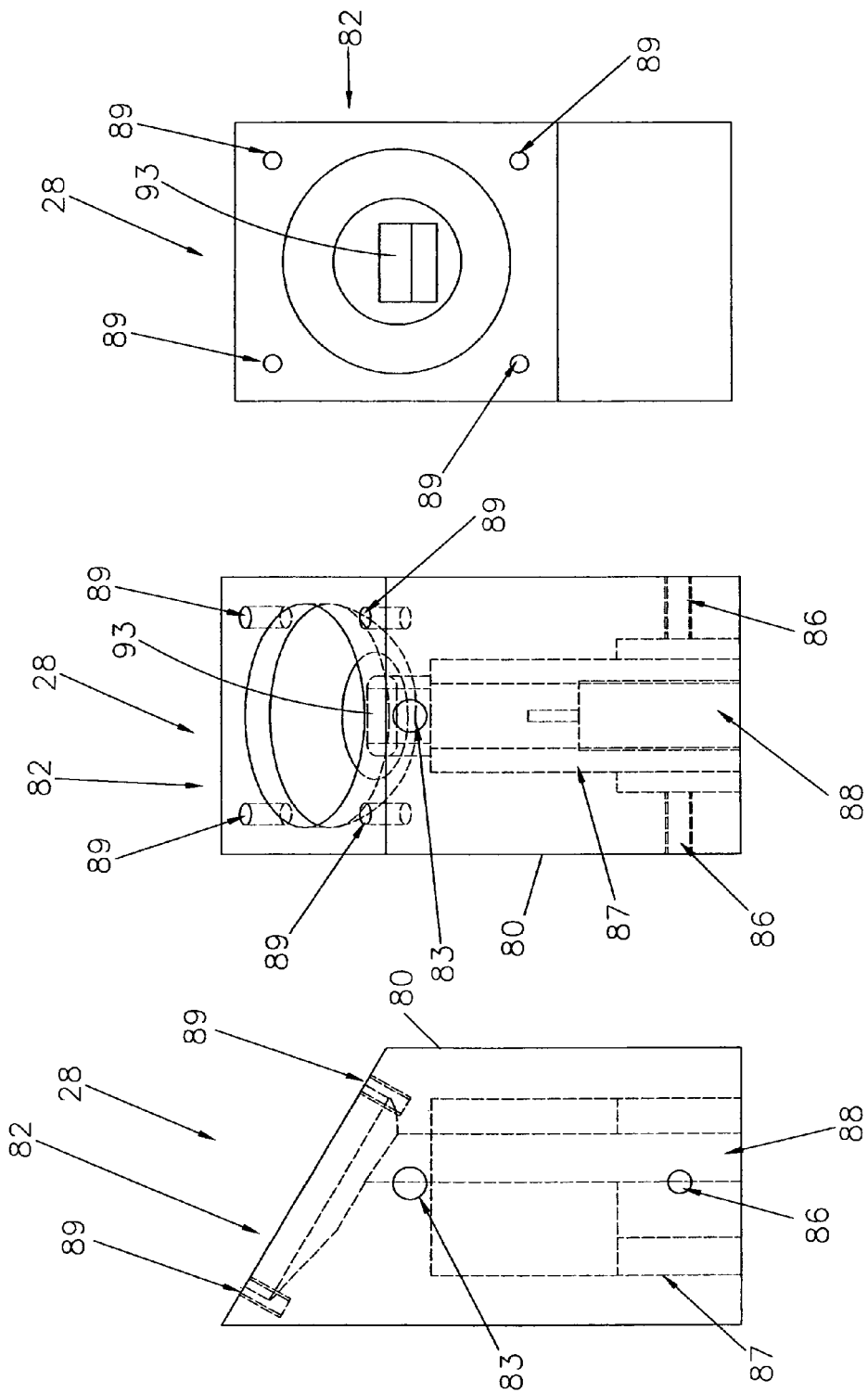

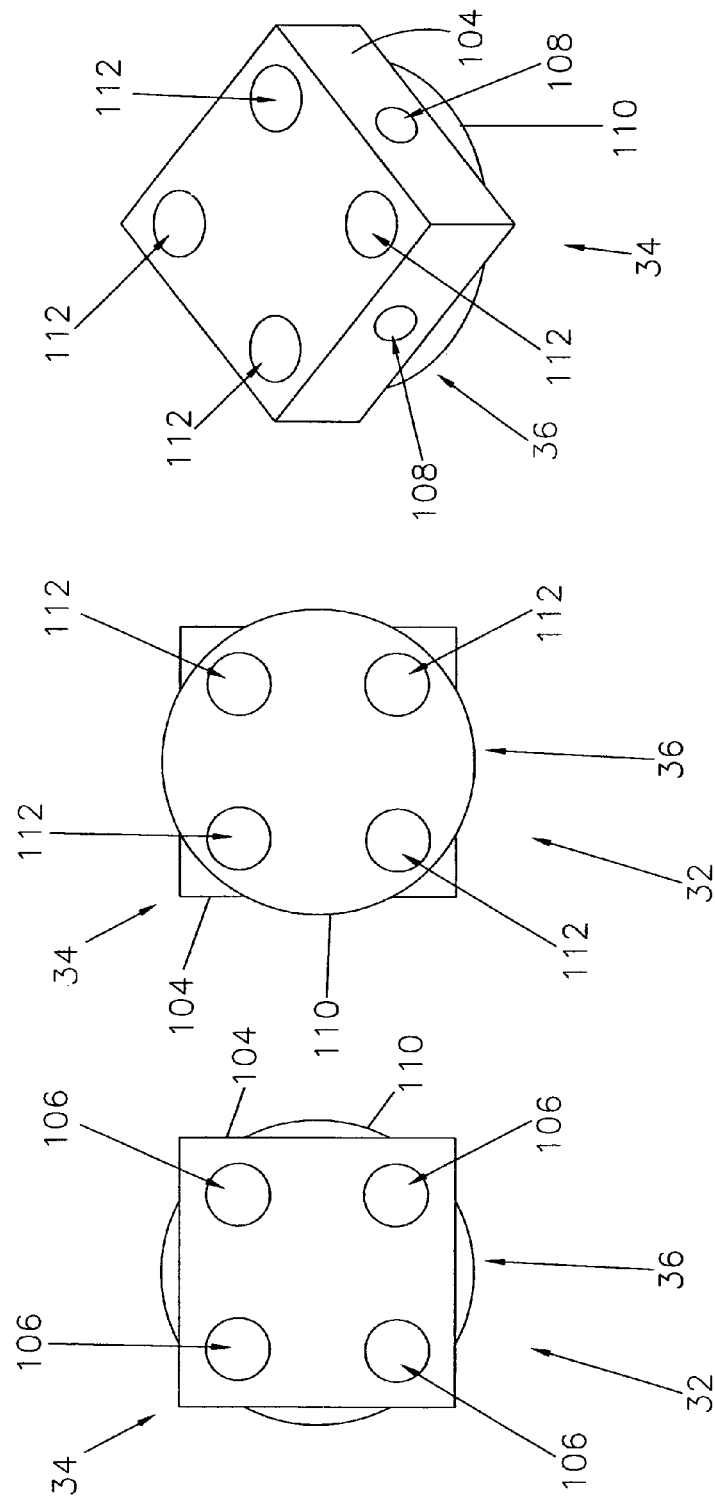

TABLET BASED KIOSK

BACKGROUND

1. Field of the Invention

A tablet based kiosk to house and support a tablet and card swipe or scanner to receive and transmit data or information to a remote site.

2. Description of the Prior Art

Personal computers are carried universally for the convenience of individual users. Such personal computers or tablets dedicated for a specific use may be employed with docking stations, in malls or other public locations to receive and transmit data to a remote site or sites.

Unfortunately, conventional docking stations generally do not have a means to secure the personal computer. Since such computers are not locked to the docking station, the personal computers are easily removed from the docking stations.

U.S. Pat. No. 5,506,393 shows a donation kettle that permits a contributor to make a donation comprising a display, keyboard, a surface for collecting a cash donation, a credit card and/or debit card donation processor. The donation kettle associates a donation with an account of a contributor, tallies information regarding a number of donations, and stores information regarding a donation, and a plurality of donations. The donation kettle is part of a donation kettle network which consists of a donation kettle, a terminal, and a communication link between the donation kettle and the terminal.

U.S. Pat. No. 7,079,384 relates to a portable computer and docking station locking structure in which the docking station has a lock provided inside the support arm controlled by a key. The portable computer has a lock hole in the back side adapted to receive the swivel locking member of the lock for enabling the portable computer to be locked to the docking station after setting of the portable computer in the support arm of the docking station.

U.S. Pat. No. 8,182,426 discloses a diagnostic system comprising a tablet type electronic device for ultrasonic diagnosis with docking station for mounting the electronic device. The docking station includes a receptacle section against which one side of the electronic device comes into abutment when mounting the electronic device and a hold-down section for holding down the electronic device releasably on the side opposite to the one side when mounting the electronic device.

US 2005/0213298 shows a docking station for a tablet computer comprising a docking assembly for positioning with three degrees of freedom and having a data connector for mechanically supporting and interfacing with the tablet computer. A support member couples the cradle assembly to an expansion base.

US 2006/0148575 shows an entertainment system comprising a video system having a video monitor and a video source, and a cradle secured within an automobile. The cradle is shaped and dimensioned for selectively receiving and securely holding the video system.

US 2006/0221565 discloses an ultra thin tablet computer and docking station system with an edge mounted battery with an optional extended battery.

US 2011/0192681 discloses a kiosk configured to accept a plurality of different types of connections corresponding to a plurality of different types of customer media. In one example, the kiosk includes a mount; a computer in a first position on the mount including a touchscreen, a card reader, and a processor; a storage medium coupled to the processor containing content; and a content transfer device coupled to the processor. The content transfer device is configurable to include at least one connection of a plurality of different types of connections corresponding to a plurality of different types of customer media. The kiosk further includes a panel in a second position on the mount adjacent to the computer including at least one connection mounting location, and the at least one connection is removably mounted to the panel at the connection mounting location. The processor stores the content in the storage medium, operates the touch screen to display a menu of the content and to record selections made by a customer from the menu, operates the card reader to read a payment card of the customer as payment for content associated with the customer selections, and transfers the content associated with the customer selections to a removable storage medium of the customer.

Additional examples of the prior art are found in U.S. Pat. No. 5,665,952; U.S. Pat. No. 5,696,366; U.S. Pat. No. 5,869,825; U.S. Pat. No. 5,909,794; U.S. Pat. No. 6,092,052; U.S. Pat. No. 8,160,922; US 2007/0244810; US 2008/0033855; US 2008/0195532; US 2008/0195533; US 2010/0312658; US 2012/0022955; US 2012/0185314 and US 2012/0232980.

While some of the prior art may contain some similarities relating to the present invention, none teach, suggest or include all of the advantages and unique features of the invention disclosed hereafter.

SUMMARY OF THE INVENTION

The present invention relates to a tablet based kiosk to securely support a tablet or other two-way communications device such as a personal computer comprising a frame supported above the floor or other support surface by a stand to receive and transmit data or information to a remote site.

The frame comprises a front frame member and a back frame member to house the tablet therebetween. In addition, a card swipe may be mounted on the frame for use in combination with the tablet.

The back frame member comprises a plurality of ventilation ports or vents and a plurality of upper locking lugs or elements formed on the outer surface of the back frame member.

An upper coupling assembly including a plurality of lower locking lugs or elements to engage the upper locking lugs or elements to secure the frame and tablet to the stand.

When assembled, the user has access to the tablet through an opening in the front frame member to communicate with a remote site to exchange data as well as swipe a card using the card swipe on the frame.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 11 is a top view of the first upper coupling member of the present invention.

FIG. 12 is a side view of the first upper coupling member of the present invention.

FIG. 13 is a perspective view of the first coupling member of the present invention.

FIG. 14 is a side view of the second upper coupling member of the present invention.

FIG. 15 is a front view of the second upper coupling member of the present invention.

FIG. 16 is a top view of the second upper coupling member of the present invention.

FIG. 20 is a top view of the lower coupling assembly of the present invention.

FIG. 21 is a bottom view of the lower coupling assembly of the present invention.

FIG. 22 is a perspective view of the lower coupling of the present invention.

Similar reference characters refer to similar parts throughout the several views of the drawings.

DESCRIPTION OF THE PREFERRED EMBODIMENT

As shown in FIGS. 1 through 4, the present invention relates to a tablet based kiosk generally indicated as to 10 to securely support a tablet such as an iPad® or other two-way communications device generally indicated 12 to receive and transmit data or information such as payments to a remote site. The tablet based kiosk 10 comprises a frame generally indicated as 14 supported above the floor or other support surface by a stand generally indicated as 16.

Figure 1:
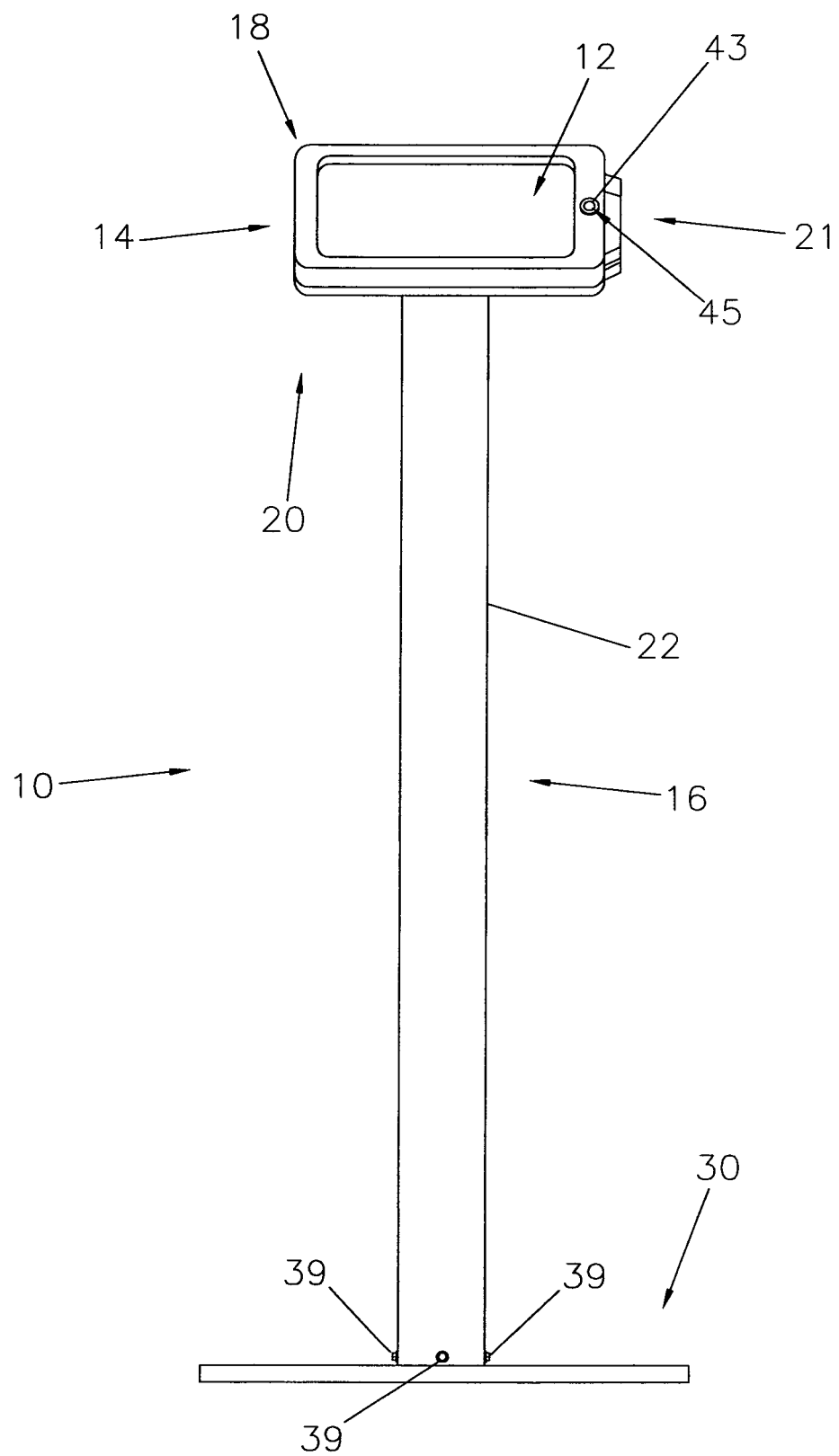
FIG. 1 is a front view of the tablet based kiosk of the present invention.
Figure 2:
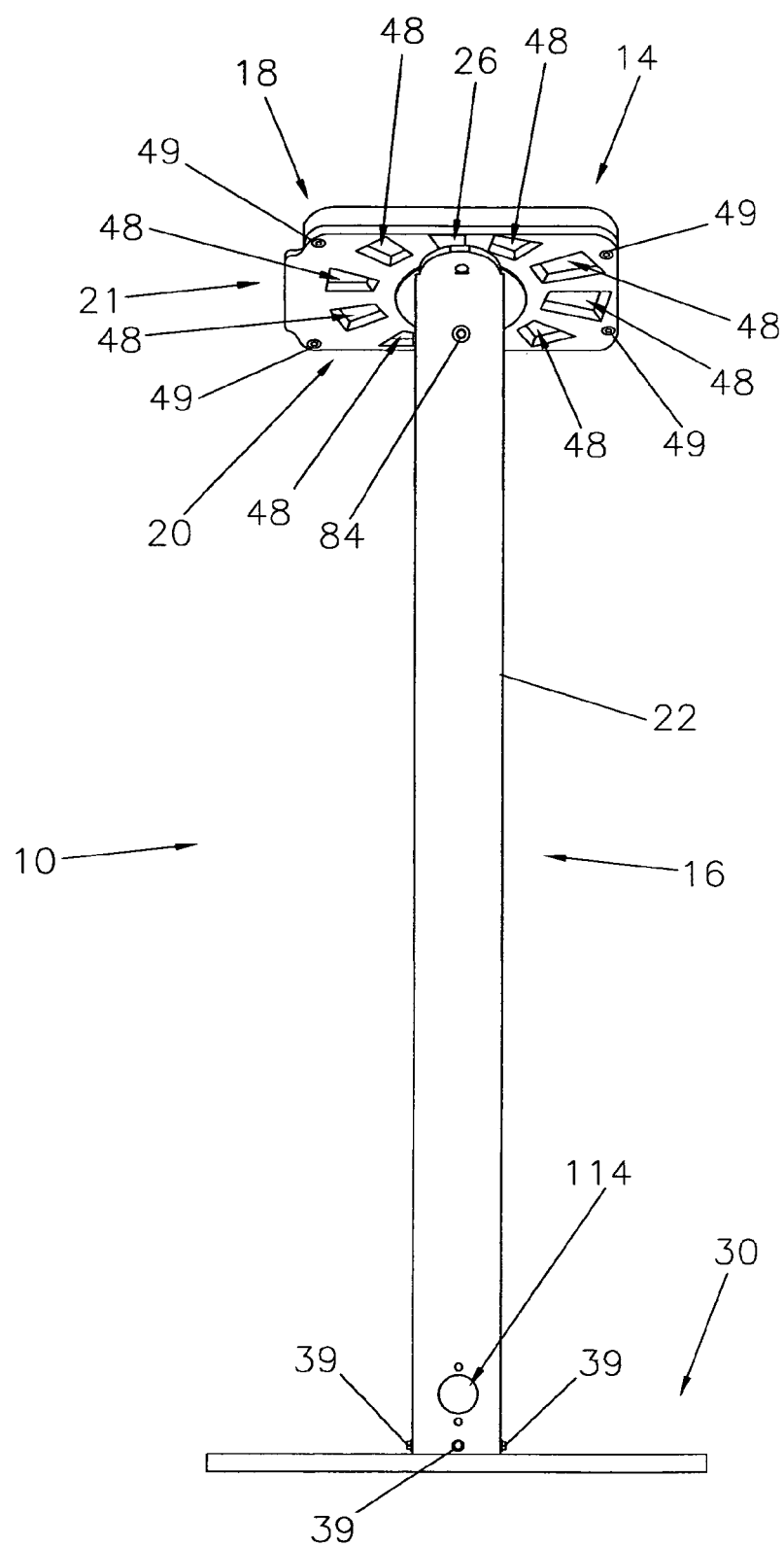
FIG. 2 is a back view of the tablet based kiosk of the present invention.
Figure 3:
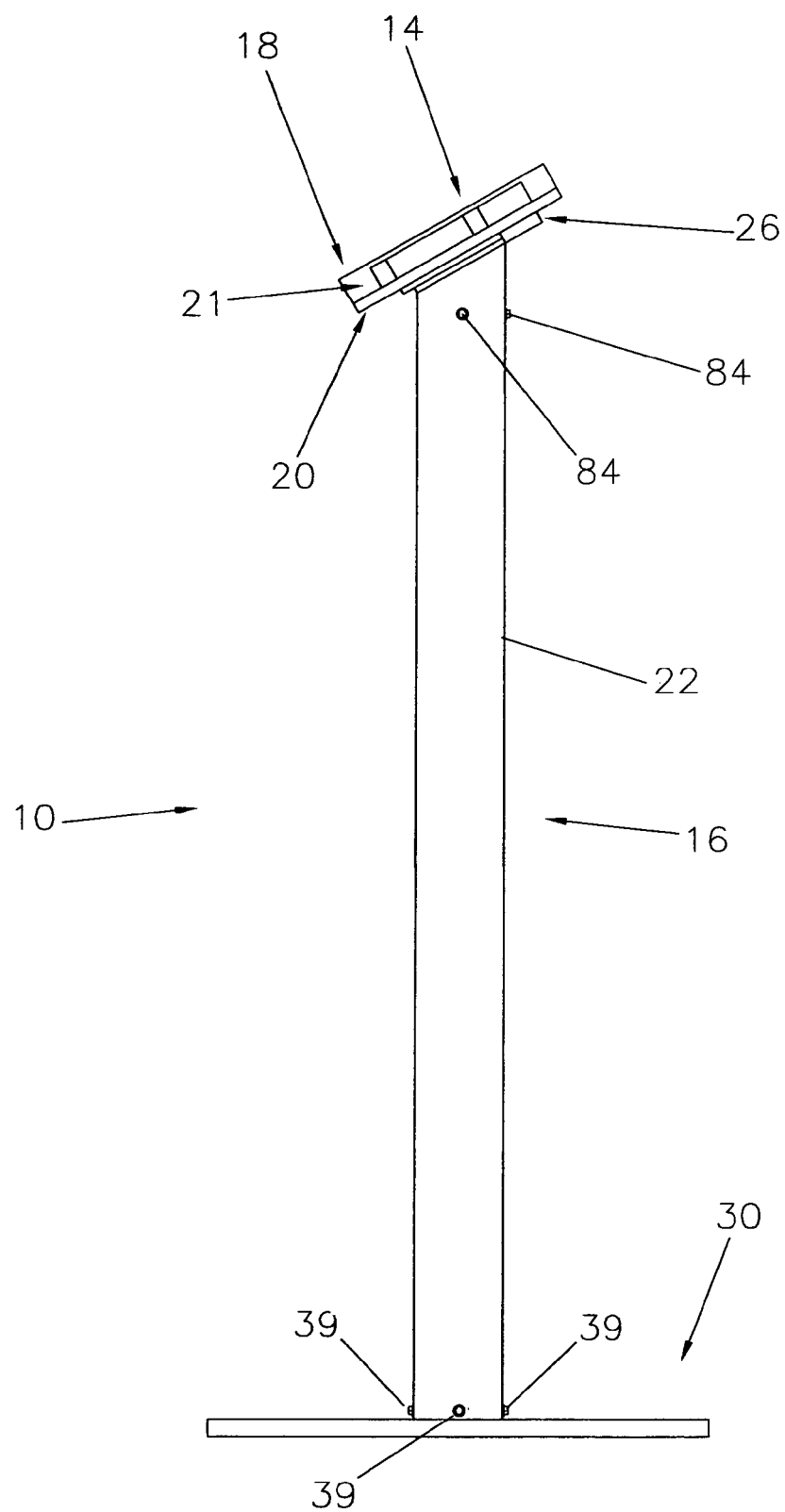
FIG. 3 is a side view of the tablet based kiosk of the present invention.
Figure 4:
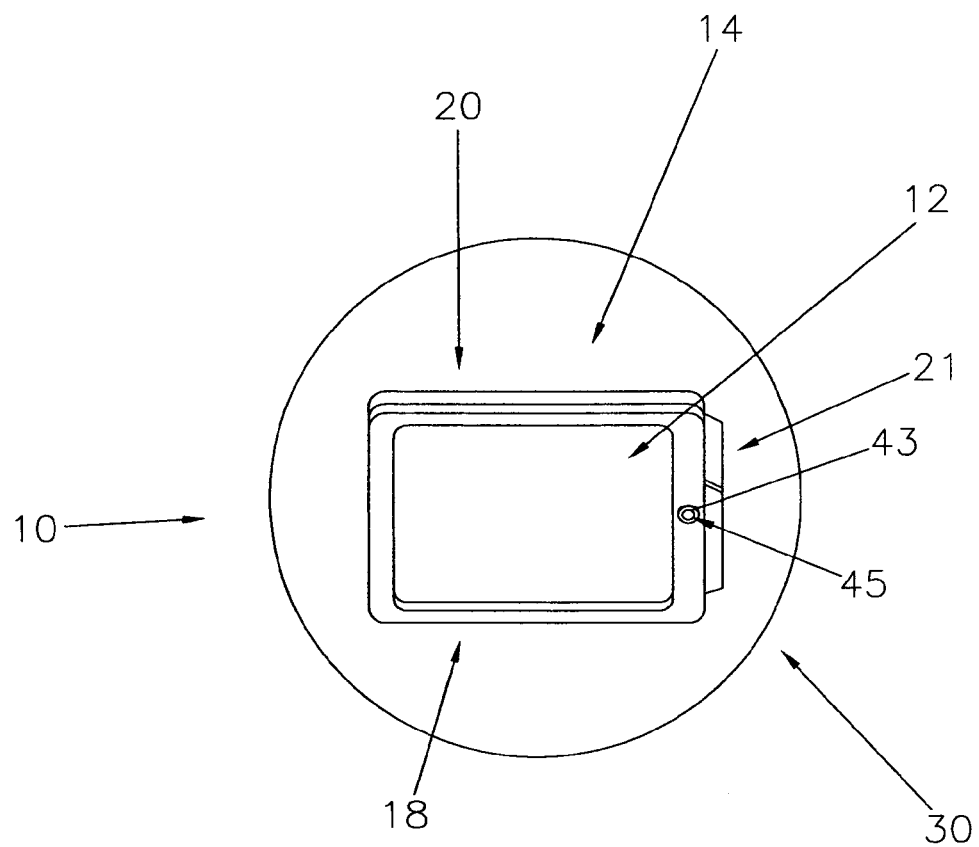
FIG. 4 is a top view of the tablet based kiosk of the present invention.
Figure 5:
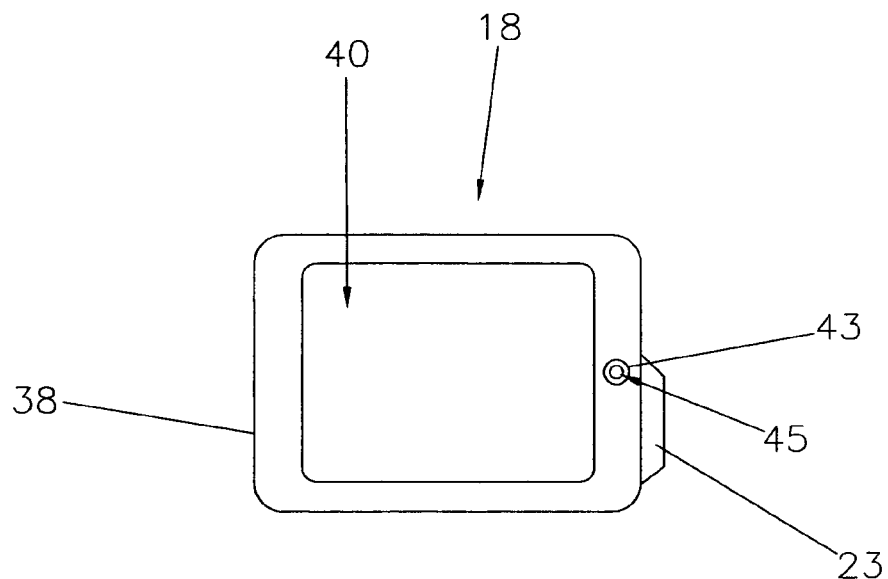
FIG. 5 is a top view of the front frame member of the present invention.
Figure 6:
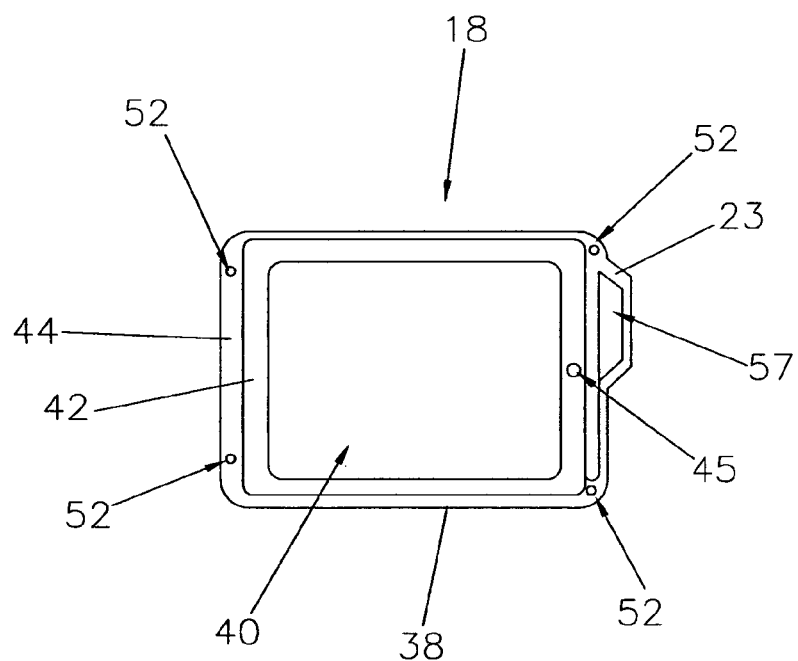
FIG. 6 is a bottom view of the front frame member of the present invention.
Figure 7:
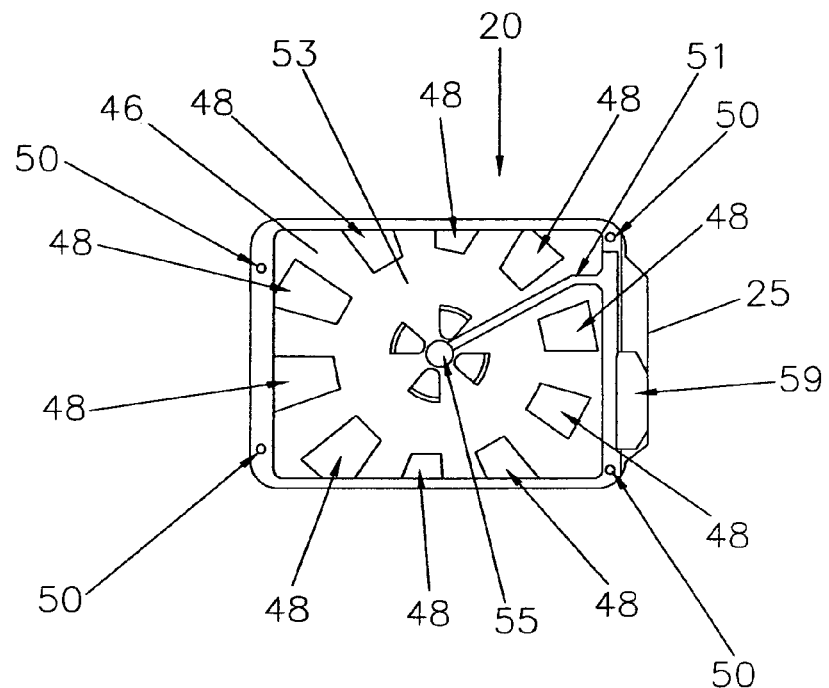
FIG. 7 is a top view of the back frame member of the present invention.
Figure 8:
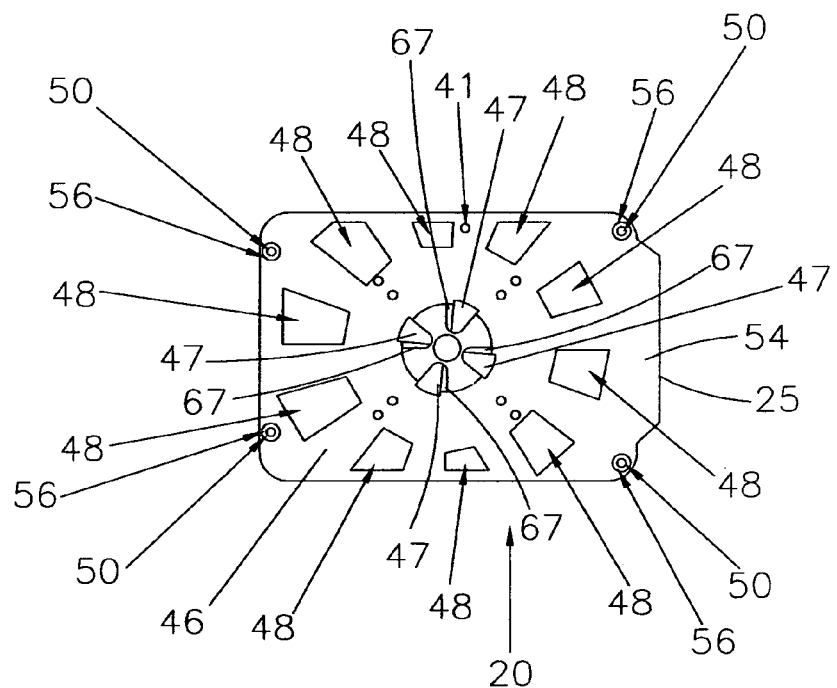
FIG. 8 is a bottom view of the back frame member of the present invention.

As shown in FIGS. 5 through 8, the frame 14 comprises a front frame member and a back frame member generally indicated as 18 or 20 respectively to retain the tablet 12 therein. A card swipe generally indicated as 21 (FIGS. 5 and 6) comprising an upper card swipe element 23 formed on the open front frame member 18 and a lower card swipe element 25 formed on the back frame member 20 (FIGS. 7 and 8). The tablet 12 and the card swipe 21 are coupled to power supply (not shown) through an interface (not shown).

Figure 9:
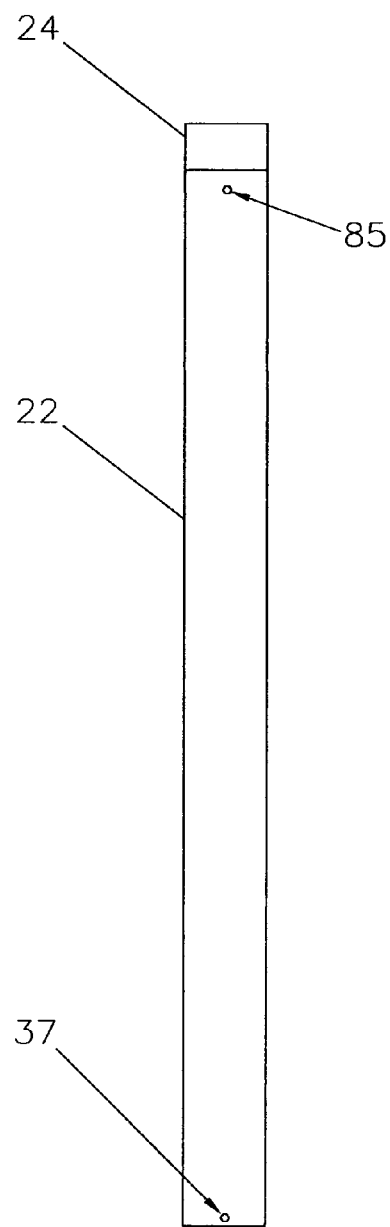
FIG. 9 is a front view of the substantially vertical hollow rectangular pole of the present invention.
Figure 10:
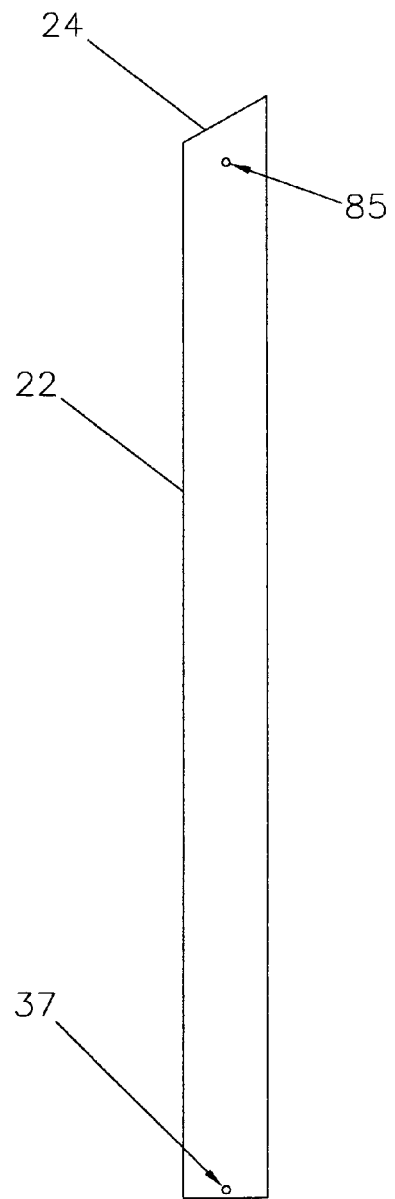
FIG. 10 is a side view of the substantially vertical hollow rectangular pole of the present invention.

As shown in FIGS. 9 through 22, the stand 16 comprises a substantially vertical hollow rectangular pole 22 having a diagonally inclined upper end portion 24 (FIGS. 9 and 10) coupled to the frame 14 by an upper coupling assembly including a first upper coupling member generally indicated as 26 (FIGS. 11 through 13) and a second upper coupling member generally indicated as 28 (FIGS. 14 through 16), and coupled to a base generally indicated as 30 (FIGS. 17 through 19) by a lower coupling assembly generally indicated as 32 including a first lower coupling member generally indicated as 34 and a second lower coupling member generally indicated as 36 (FIGS. 20 through 22). A fastener aperture 37 is formed on the lower portion of each side of the substantially vertical hollow substantially rectangular pole 22 of the stand 16.

As best shown in FIGS. 5 and 6, the front frame member 18 comprises a peripheral frame 38 cooperatively forming an access opening 40 to permit the user to interact with the tablet 12 or other two-way communications device. A peripheral recessed retainer shelf 42 is formed on the inner face or surface 44 of the peripheral frame 38 of the open front frame member 18 to engage the front periphery of the tablet 12 or other two-way communications device to retain the tablet 12 or other two-way communication device in the frame 14. An ON/OFF or control switch 43 accessible to the user through a hole or aperture 45 formed in the mid-portion of the side of the peripheral frame 38 of the front face member 18 is coupled to the power supply (not shown) to selectively energize or activate the tablet 12 and card swipe 21. Of course, the position of the control switch 43 and the hole or aperture 45 may be located elsewhere on the on the peripheral frame 38 dependent on the tablet 12 used.

As best shown in FIGS. 7 and 8, the back frame member 20 comprises a recessed or counter-sunk back plate 46 to engage the inner surface 53 of the back frame member 20 to support the tablet 12. A plurality of ventilation ports or vents each indicated as 48 are formed through the recessed or counter-sunk back plate 46 of the back frame member 20. A lock recess 41 is formed in the outer surface 54 of the back frame member 20. In addition, plurality of upper locking lugs or elements each indicated as 47 are disposed in spaced relationship relative to the outer surface 54 of the back frame member 20.

An upper card swipe recess 57 and a lower card swipe recess 59 are formed in the upper card swipe element 23 and the lower card swipe element 25 respectively to cooperatively form a cavity to house a card swipe device (not shown). A channel 51 is formed in the inner surface 53 of the back frame member 20 to receive a conductor or cable (not shown) to couple the card swipe 21 to the power source (not shown).

The front frame member 18 and the back frame member 20 are secured together by fasteners 49 extending through holes 50 formed in the four corners of the back frame member 20 into internally threaded holes or recesses 52 formed in the four corners of the open front frame member 18. The outer surface 54 of the back frame member 20 includes recesses 56 concentrically formed around the holes 50 to receive the outer portion of the fasteners 49.

As best shown in FIGS. 11 through 13, the first upper coupling member 26 comprises a flat substantially circular base plate 58 including a central opening or aperture 60 formed therethrough and having a substantially circular ring 62 extending outwardly from the face or front surface 64 thereof in concentric alignment with the central opening or aperture 60. A plurality of lower locking lugs or elements each indicated as 66 extend outwardly from the upper portion of the substantially circular ring 62 in spaced relationship relative to the face or front surface 64 of the flat substantially circular base plate 58 to engage the plurality of upper locking lugs or elements 47 to secure the frame 14 to the first upper coupling member 26 of the upper coupling assembly of the stand 16. Each lower locking lug or element 66 includes a lug stop 67 extending inwardly to engage the corresponding upper locking lug or element 47 to limit rotation of the back frame member 20 relative to the first upper coupling member 26 during assembly to align corresponding upper locking lugs or elements 47 with the corresponding lower locking lugs or elements 66 and the front frame member 18 and the back frame member 20 relative to each other. A plurality of holes each indicated as 68 each having an outer recess portion 70 are formed through the flat substantially circular base plate 58 to receive corresponding fasteners (not shown) therethrough to secure the first upper coupling member 26 to the second upper coupling member 28.

In addition, the first upper coupling member 26 includes a convex arcuate extension 72 extending outwardly from the upper circumference of the flat substantially circular base plate 58 having a centrally disposed hole or aperture 74 formed therethrough to receive a lock pin 75 movable between an unlocked or retracted position and a locked or extending position by extending the lock pin 75 into the lock recess 41 formed on the outer surface 54 of the back frame member 20 to prevent rotational movement of the frame 14 relative to the upper coupling member 26 when the corresponding upper locking lugs 47 and the locking lugs or elements 66 are aligned and locked. A recess 76 is concentrically formed around the centrally disposed hole or aperture 74 to receive the outer portion of the fastener (not shown).

At least two spring-loaded or biased convex support elements each indicated as 77 are disposed within a corresponding recess 79 formed on the face or front surface 64 of the first upper coupling member 26 to engage and partially support the back frame member on the first upper coupling member 26.

As best shown in FIGS. 14 through 16, the second upper coupling member 28 comprises a substantially rectilinear housing 80 including a diagonally inclined upper end portion 82 corresponding to the diagonally inclined upper end portion 24 of the substantially vertical hollow substantially rectilinear pole 22 such that the substantially rectilinear housing 80 fits into or is disposed within the upper portion of the substantially vertical hollow substantially rectangular pole 22 with the diagonally inclined upper end portion 82 and the diagonally inclined upper end portion 24 aligned and secured in place by fasteners 84 extending through holes 85 formed through the substantially vertical hollow substantially rectangular pole 22 (FIGS. 9 and 10) and into internally threaded holes 83 formed on each surface of the substantially rectilinear housing 80 of the second upper coupling member 28.

As best shown in FIGS. 14 through 16, an upper power supply cavity 87 and lower AC cable channel 88 are formed in the second upper coupling member 28 to receive a power block (not shown) and an AC power supply cable (not shown) respectively. A set screw hole 86 is formed on each side of the substantially rectilinear housing 80 of the second upper coupling member 28 to position and retain the power block (not shown) within the upper power supply cavity 81. In addition, a channel 89 is formed on each corner of the upper substantially diagonally surface 91 of the first upper coupling member 26 corresponding to the plurality of holes 68 formed through the recess fasteners (not shown) therethrough to secure the first upper coupling member 26 and the second upper coupling member 28 together.

The tablet 12 and card swipe 21 are coupled to the power supply or converter by a connector 93.

Figure 19:
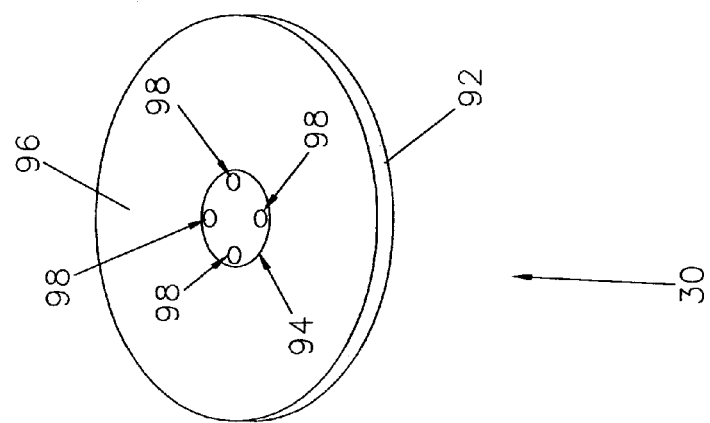
FIG. 19 is a perspective view of the base of the present invention.
Figure 18:
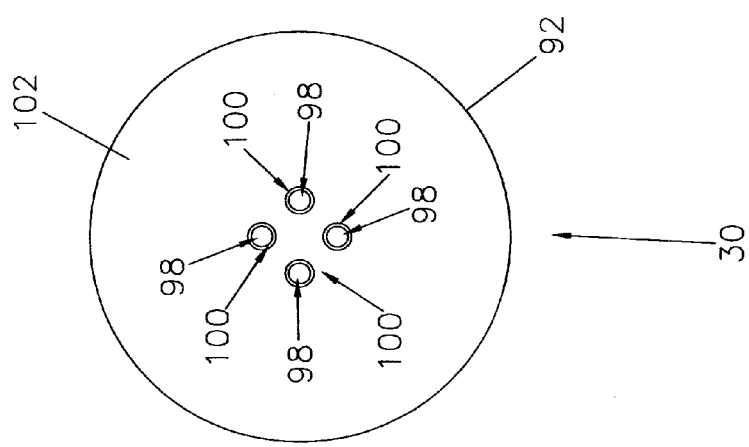
FIG. 18 is a bottom view of the base of the present invention.
Figure 17:
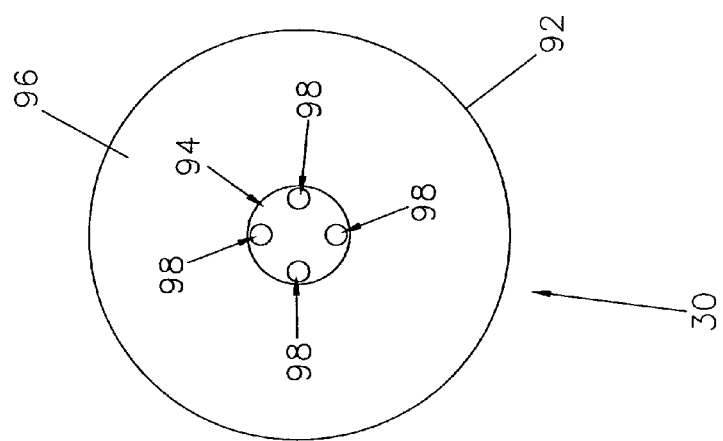
FIG. 17 is a top view of the base of the present invention.

As best shown in FIGS. 17 through 19, the base 30 comprises a flat substantially circular base plate 92 including a centrally disposed recess 94 formed on the upper surface 96 thereof having a plurality of apertures each indicated as 98 within the centrally disposed recess 94 to receive fasteners (not shown) therethrough to secure the lower coupling assembly 32 thereto as described hereinafter. In addition, a countersunk recess 100 is formed on the bottom 102 of the flat substantially circular base plate 92 of the base 30 in concentric alignment with each aperture 98 to receive the outer end of each fastener (not shown) extending through the aperture 98.

As best shown in FIGS. 20 through 22, the first lower coupling member 34 of the lower coupling assembly 32 comprises a substantially rectilinear block 104 sized and shaped to snugly fit inside the lower end portion of the substantially vertical hollow substantially rectilinear pole 22 of the stand 16. A plurality of substantially vertical holes each indicated as 106 and a plurality of substantially horizontal recesses each indicated as 108 are formed in the substantially rectilinear block 104 to secure the lower coupling assembly 32 to the flat substantially circular base plate 92 of the base 30 and the lower portion of the substantially vertical hollow substantially rectilinear pole 22 of the stand 16 respectively as described hereinafter.

As best shown in FIGS. 20 through 22, the second lower coupling member 36 of the lower coupling assembly 32 comprises a flat substantially circular disk 110 sized and shaped to fit snugly within the centrally disposed recess 94 of the flat substantially circular base plate 92 of the base 30 such that the bottom surface of the substantially rectilinear block 104 of the first lower coupling member 34 of the lower coupling assembly 32 engages and rests upon the upper surface 96 of the flat substantially circular base plate 92 of the base 30. A plurality of holes each indicated as 112 is formed through the flat substantially circular disk 110 of the second lower coupling member 36 each in concentric alignment with a corresponding substantially vertical holes 106 formed through the substantially rectilinear block 104 of the first lower coupling member 34 of the lower coupling assembly 32.

When the substantially vertical hollow substantially rectangular pole 22, lower coupling assembly 32 and base 30 are assembled, each substantially horizontal recess 108 is aligned with a corresponding fastener aperture 37 formed through the lower portion of each side of the substantially vertical hollow substantially rectangular pole 22 of the stand 16 to receive a corresponding fastener 39 therethrough and each substantially vertical hole 106 and hole 112 is aligned with a corresponding aperture 98 formed in the flat substantially circular base plate 92 of the base 30 to receive fasteners therethrough to secure the substantially vertical hollow substantially rectangular pole 22 to the base 30.

The lock mechanism comprises a first locking assembly to secure the frame 14 to upper coupling assembly and a second locking assembly to prevent rotation of the frame 14 relative to the upper coupling assembly. The first locking assembly comprises the plurality of upper locking lugs or elements 47 disposed in spaced relationship relative to the outer surface 54 of the back frame member 20 and the plurality of lower locking lugs or elements 66 extending outwardly from the upper portion of the substantially circular ring 62 in spaced relationship relative to the face or front surface 64 of the flat substantially circular base plate 58 to engage the plurality of the upper locking lugs or elements 47. The second locking assembly comprises the lock recess 41 formed in the inner surface 53 of the back frame member 20 to receive the lock pin 75 mounted to the first upper coupling member 26 when the lock pin 75 is moved from the unlocked or retracted position to the locked or extended position by a securing key.

The upper locking lugs or elements 47 are initially aligned with the spaces between the lower locking lugs or elements 66 to engage the face or front surface 64 of the recess 56 and then the front frame member 18 is rotated relative to the back frame member 20 to align corresponding upper locking lugs or elements 47 with the lower locking lugs or elements 66 to lock the front frame member 18 in place relative to the back frame member 20. With front frame member 18 and back frame member 20 secured together, the lock pin 75 is moved to the locked or extended position within the lock recess 41 to prevent rotational movement of the frame 14 and tablet 12 relative to the stand 16.

An aperture 114 is formed through one side of the substantially vertical hollow substantially rectangular pole 22 of the stand 16 to receive a power supply cable (not shown) therethrough.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A tablet based kiosk to securely support a tablet to receive, transmit and display information or data comprising a tablet mount including a frame to retain or house the tablet therein and a card swipe housing to operatively retain a card swipe device to scan information from a card to transmit information from the tablet and card scanner to a remote site, said frame comprises a front frame member and a back frame member secured together to retain the tablet therein, said front frame member comprises a peripheral frame cooperatively forming an access opening permit the user to interact with the tablet, a peripheral recessed retainer shelf is formed on the inner face or surface of said peripheral frame of said front frame member to engage the front periphery of the tablet to retain the tablet in said frame and said back frame member comprises a recessed or counter-sunk back plate to engage and support the back of the tablet, a plurality of ventilation ports or vents are formed through said recessed or counter-sunk back plate, said tablet and card swipe device are supported above the floor or other surface by a stand coupled to said frame by an upper coupling assembly including a base plate and coupled to a base by a lower coupling assembly, a lock mechanism to selectively lock said tablet mount to said stand comprising a first locking assembly to secure said frame to said upper coupling assembly and a second locking assembly to prevent rotation of said frame relative to said stand, said first locking assembly comprises a plurality of upper locking lugs or elements disposed in spaced relationship relative to the outer surface of said back frame member and a plurality of lower locking lugs or elements extending outwardly from the upper portion of a ring formed on said upper coupling assembly in spaced relationship relative to said face or front surface of said base plate to engage said plurality of the upper locking lugs or elements to secure said frame to said first upper coupling member and said second locking assembly comprises a lock recess formed in the inner surface of said back frame member to receive a lock pin mounted to said first upper coupling member when said lock pin is moved from an unlocked or retracted position to a locked or extended position by a securing key.

2. The tablet based kiosk of claim 1 wherein said upper coupling assembly includes a first upper coupling member and a second upper coupling member.

3. The tablet based kiosk of claim 2 wherein each lower locking lug or element includes a lug stop extending inwardly to engage the corresponding upper locking lug or element to limit rotation of said frame relative to said first upper coupling member during assembly to align corresponding upper locking lugs or elements and corresponding lower locking lugs or elements and said front frame member and said back frame member relative to each other.

4. The tablet based kiosk of claim 3 wherein said second upper coupling member comprises a housing including a diagonally inclined upper end portion corresponding to a diagonally inclined upper end portion of said stand such that said diagonally inclined upper end portion of said housing is disposed within the upper portion of said stand.

5. The tablet based kiosk of claim 4 wherein said lower coupling assembly comprises a first lower coupling member and a second lower coupling member.

6. The tablet based kiosk of claim 5 wherein said first lower coupling member comprises a block sized and shaped to snugly fit inside the lower end portion of said stand.

7. The tablet based kiosk of claim 6 wherein said second lower coupling member comprises a disk shaped to fit snugly within a recess formed in said base such that the bottom surface of said block of the first lower coupling member engages and rests upon the upper surface of said base.

8. The tablet based kiosk of claim 2 further including at least two spring-loaded or biased convex support elements disposed within a corresponding recess formed on the face or surface of said first upper coupling member to engage and partially support said back frame member on said first upper coupling member.

9. The tablet based kiosk of claim 2 wherein an upper power supply cavity and lower AC cable channel are formed in said second upper coupling member to receive an AC adapter and an AC power supply cable respectively.

10. The tablet based kiosk of claim 1 wherein said card swipe comprises an upper card swipe element formed on the front frame member and a lower card swipe element formed on the back frame member.

11. The tablet based kiosk of claim 10 wherein an upper card swipe recess and a lower card swipe recess are formed in said swipe in said upper card swipe element and the lower card swipe element respectively to cooperatively form the cavity to house a card swipe device.

12. The tablet based kiosk of claim 11 wherein a channel is formed in the inner surface of said back frame member to receive a cable to couple the card swipe to the power source.

* * * * *